United States Patent
Hessling Von Heimendahl et al.

(10) Patent No.: US 9,655,186 B2
(45) Date of Patent: May 16, 2017

(54) EMERGENCY LIGHTING SYSTEM FOR AN AIRCRAFT AND AIRCRAFT COMPRISING SUCH EMERGENCY LIGHTING SYSTEM

(71) Applicant: Goodrich Lighting Systems GmbH, Lippstadt (DE)

(72) Inventors: Andre Hessling Von Heimendahl, Koblenz (DE); Frank Klein, Langenberg (DE); Benno Heissig, Geseke (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 208 days.

(21) Appl. No.: 14/504,867

(22) Filed: Oct. 2, 2014

(65) Prior Publication Data
US 2015/0091438 A1 Apr. 2, 2015

(30) Foreign Application Priority Data
Oct. 2, 2013 (EP) .................................. 13187034

(51) Int. Cl.
| | |
|---|---|
| H05B 41/14 | (2006.01) |
| H05B 33/08 | (2006.01) |
| B64D 11/00 | (2006.01) |
| B64D 47/02 | (2006.01) |
| B60Q 3/02 | (2006.01) |
| H02J 9/06 | (2006.01) |

(52) U.S. Cl.
CPC ....... H05B 33/0842 (2013.01); B60Q 3/0256 (2013.01); B60Q 3/0259 (2013.01); B64D 11/00 (2013.01); B64D 47/02 (2013.01); H02J 9/065 (2013.01); B64D 2011/0038 (2013.01); B64D 2203/00 (2013.01); Y02T 50/53 (2013.01)

(58) Field of Classification Search
CPC . B64D 2111/0038; B64D 25/00; B64D 11/00; B64D 47/02; B64D 2203/00; H05B 33/0842; B60Q 3/0256; B60Q 3/0259
USPC ...................................................... 315/86, 87
See application file for complete search history.

(56) References Cited

U.S. PATENT DOCUMENTS

| | | | |
|---|---|---|---|
| 2009/0102296 A1* | 4/2009 | Greene | H01Q 1/248 307/149 |
| 2012/0176808 A1* | 7/2012 | Rust | B64D 11/00 362/470 |
| 2014/0036686 A1* | 2/2014 | Bommer | H04W 24/06 370/241 |

FOREIGN PATENT DOCUMENTS

| | | |
|---|---|---|
| EP | 1681908 A1 | 7/2006 |
| EP | 2476616 A2 | 7/2012 |

OTHER PUBLICATIONS

European Search Report for Application No. 13187034.7-1754, Mailed on Apr. 28, 2014, 7 pages.

\* cited by examiner

*Primary Examiner* — Don Le
(74) *Attorney, Agent, or Firm* — Cantor Colburn LLP

(57) ABSTRACT

An emergency lighting system for an aircraft includes an emergency light control unit, having an external power input and at least one external control input for receiving external control commands from at least one of a cockpit crew, a cabin crew, a board computer and an autopilot, and a plurality of autonomous emergency light units, each of the plurality of autonomous emergency light units comprising at least one LED and a rechargeable capacitor. The emergency light control unit is configured to process the external control commands and to communicate emergency light control commands to the plurality of autonomous emer- (Continued)

gency light units as a response to the external control commands.

7 Claims, 5 Drawing Sheets

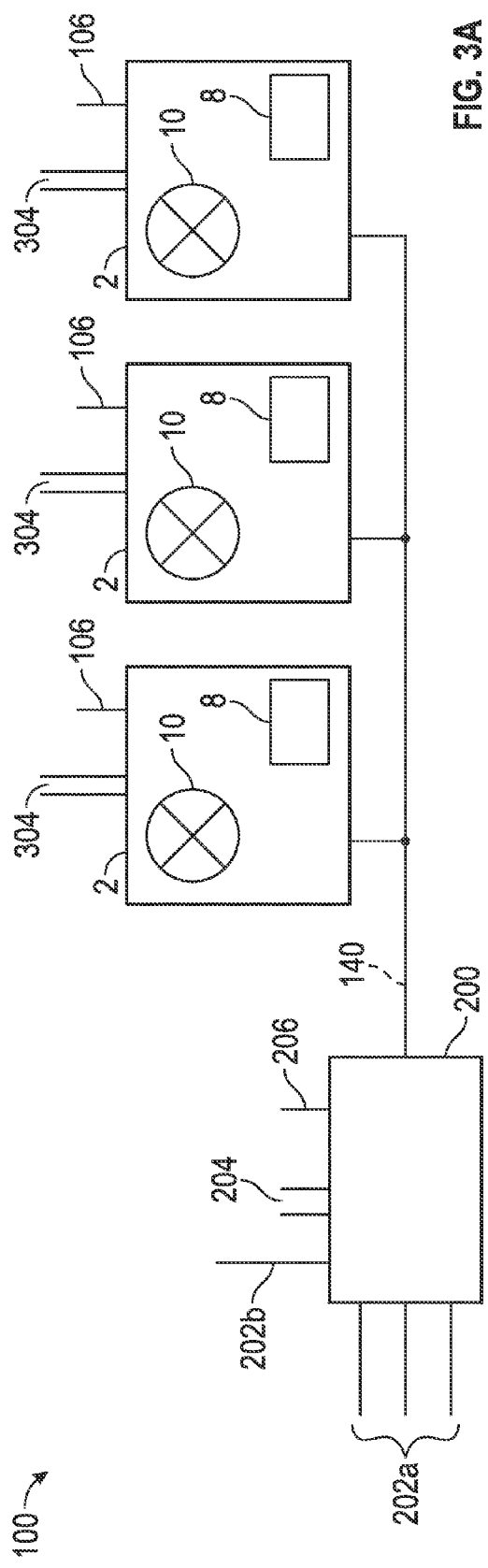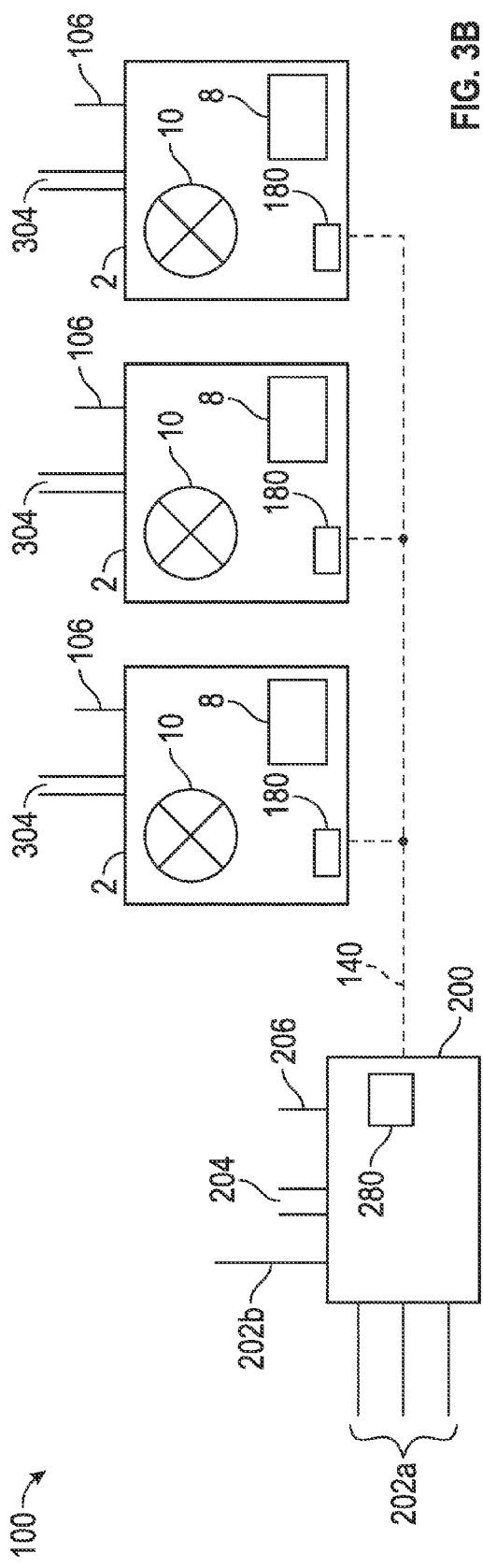

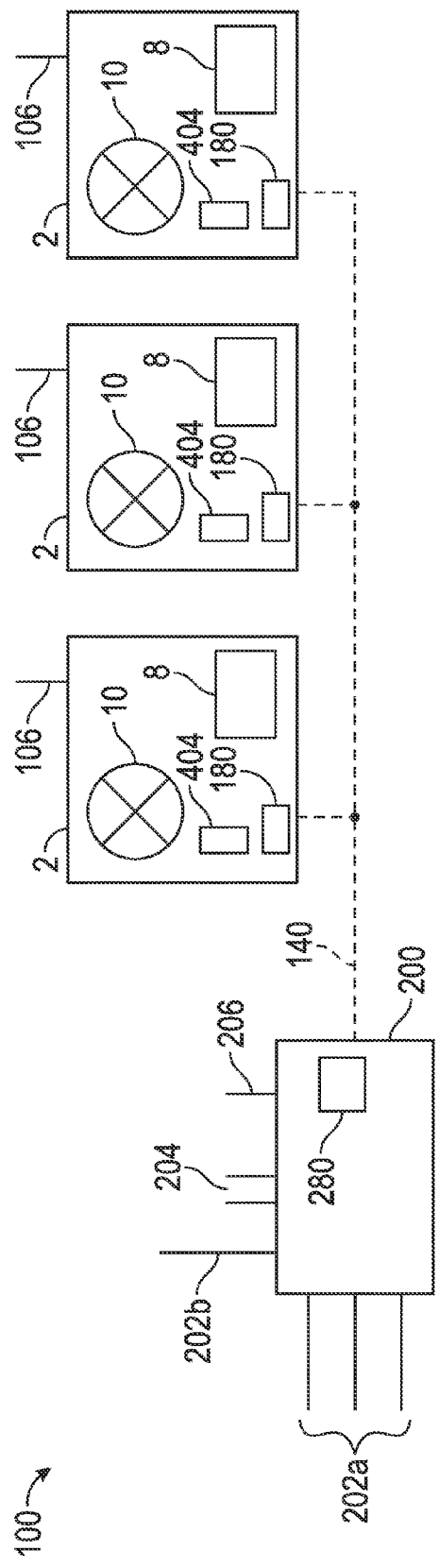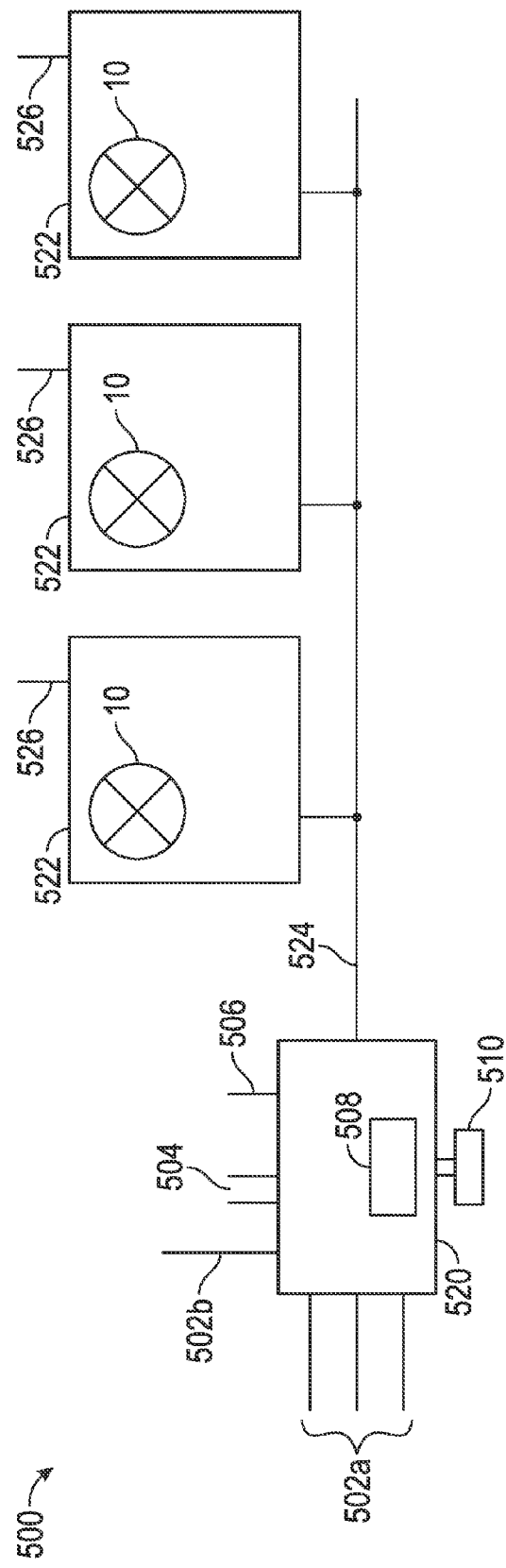

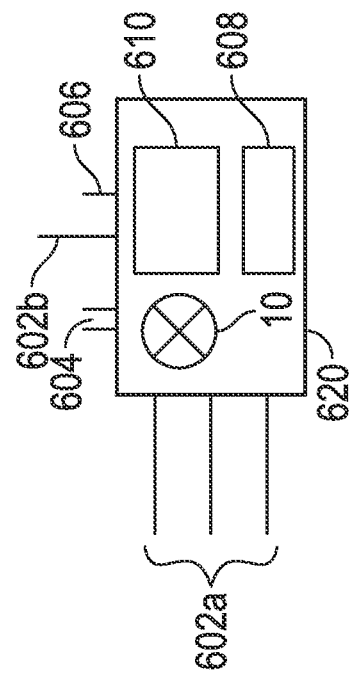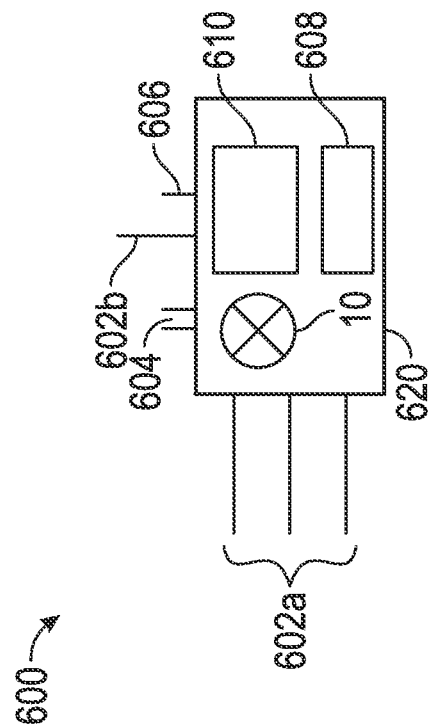
FIG. 5

US 9,655,186 B2

EMERGENCY LIGHTING SYSTEM FOR AN AIRCRAFT AND AIRCRAFT COMPRISING SUCH EMERGENCY LIGHTING SYSTEM

CROSS REFERENCE TO RELATED APPLICATION

This application claims priority to European Patent Application No. 13 187 034.7 filed Oct. 2, 2013, the entire contents of which is incorporated herein by reference.

TECHNICAL FIELD

The invention relates to emergency lighting in aircraft. In particular, it relates to the set-up and power management of emergency lighting systems.

BACKGROUND

Almost all aircraft have emergency lighting systems. For example, passenger aircraft have a number of emergency lights, such as emergency exit signs, light strips on the floor, emergency slide lights, etc. These emergency lights are part of an emergency lighting system.

FIG. 1 shows a conventional emergency lighting system 900 in a schematic form. The emergency lighting system 900 has 3 emergency power supplies 950, coupled between a power supply line 904 and ground 906. The emergency power supplies 950 are further coupled to a trigger line 960, through which an emergency signal can be transmitted. This emergency signal triggers emergency operation of the emergency power supplies 950. Upon receiving this trigger signal, each of the emergency power supplies 950 supplies power to various emergency lights 902, which light up. The emergency power supplies 950 contain batteries to be independent from the power line 904 in an emergency situation, for example in case of an aircraft crash resulting in a breaking of the power line 904.

In modern air planes, the maintenance efforts for such emergency lighting systems have become unacceptable. Accordingly, it would be beneficial to provide an emergency lighting system that allows for the maintenance thereof to be reduced. Further, it would be beneficial to provide an aircraft with reduced maintenance for the emergency lighting system.

SUMMARY

Exemplary embodiments of the invention include an emergency lighting system for an aircraft, which comprises an emergency light control unit, having an external power input and at least one external control input for receiving external control commands from at least one of a cockpit crew, a cabin crew, a board computer and an autopilot, and a plurality of autonomous emergency light units, each of the plurality of autonomous emergency light units comprising at least one LED and a rechargeable capacitor. The emergency light control unit is configured to process the external control commands and to communicate emergency light control commands to the plurality of autonomous emergency light units as a response to the external control commands. The provision of this emergency lighting system drastically reduces the maintenance efforts required. The provision of capacitors eliminates the need for conventional batteries, as commonly used in prior art emergency lighting systems, such as the one shown in FIG. 1. The inventive emergency lighting system does not have batteries for providing the emergency light units with power in an emergency situation. Capacitors have a very long life time, while conventional rechargeable batteries have a fairly short life time, at least when compared to the common life time of a passenger airplane. Usually, the batteries of the emergency lighting system are exchanged every two years. The provision of capacitors in the autonomous emergency light units makes the rechargeable power storage devices of the emergency lighting system virtually maintenance-free. In this way, the autonomous emergency light units ensure shorter maintenance times, requiring the air plane to be on the ground for shorter times. Also, capacitors comprise less hazardous materials than conventional batteries, have less safety issues than conventional batteries and have a larger temperature range than conventional batteries.

It is possible that each of the autonomous emergency light unit comprises a plurality of capacitors for electrical energy storage. The plurality of capacitors may be connected in parallel or in series or in a combined parallel and series connection. The space-efficiency of LED's allows for the whole autonomous emergency light unit to be space-efficient, even when capacitors are used as rechargeable power sources.

The autonomous nature of the emergency light units has the further advantages that the emergency lighting system as a whole requires less wiring and has a higher reliability, as compared to prior art systems. In particular, the provision of the rechargeable capacitor within the emergency light unit allows for a reduction of redundancy in the wiring of an emergency lighting system. The prior art requires multiple power paths to at least some of the individual emergency lights, such that a sufficient amount of emergency lighting is ensured for any given breaking point of the power wires of the emergency lighting system. In contrast thereto, the present invention provides autonomous emergency light units that are charged during normal operation of the aircraft and are self-sufficient in case of an emergency, such as a plane crash. Accordingly, one connection to a power source is sufficient for the emergency light unit to charge during normal operation and to safely operate in the emergency situation, independent from any damage to the wiring of the emergency lighting system. Moreover, for any number and location of wiring damages, the present invention still ensures the functioning of all emergency light units during the emergency situation. This feature is impossible to achieve with the conventional wiring, no matter how high the redundancy is. Also, by providing rechargeable power sources per light unit, the system capacities may be adapted better to the power needs of the individual light units. Accordingly, the emergency lighting system is decentralized, reliable and efficient.

The expression "configured to communicate emergency control commands" does not mean that a plurality of control commands are communicated at one time. To the contrary, the emergency light control unit communicates one particular control command at a time. The selection of the particular control command is determined on the basis of the external control commands received.

The expression "external power input" refers to a power input for receiving power from outside of the emergency lighting system. In a particular embodiment, the external power input is configured to be coupled to the general aircraft power network.

The autonomous emergency light units may be any kind of aircraft emergency lights. Concrete examples are exit sign lights over the exits, exit locator sign lights in the aisles, exit illumination lights for allowing the passengers to pass the exit, emergency slide lights, overwing escape lights, light strips on the floor, other emergency guide lights, etc.

According to a further embodiment, the emergency lighting system further comprises a power line between the emergency light control unit and the plurality of autonomous emergency light units, with the emergency light control unit being configured to provide the plurality of autonomous emergency light units with power via the power line for charging their respective rechargeable capacitor and illuminating their respective at least one LED. In this way, a self-sufficient emergency lighting system is provided, whose emergency light control unit forms the coupling point to a power supply outside of the emergency lighting system. Apart from this coupling point, the emergency lighting system does not require further external power provision points. Accordingly, the network architecture of the emergency lighting system is kept simple. The power provided via the power line may be used by the autonomous emergency light unit for charging its rechargeable capacitor and for illuminating its at least one LED. However, if any and which of these actions are performed by the emergency light unit, depends on the emergency light control commands. In other words, depending on the emergency light control commands, the autonomous emergency light unit may at a given time charge the capacitor or illuminate the at least one LED or both or none of these actions. The illumination of the at least one LED may be performed directly with the power received via the power line or may be performed after the power being temporarily stored in the capacitor.

According to a further embodiment, the emergency light control unit is configured to communicate the emergency light control commands to the plurality of autonomous emergency light units as a modulation of the power provided on the power line. In this way, the power line is simultaneously used as a means for power provision and for the provision of control commands to the autonomous emergency light units. The autonomous emergency light units are configured to operate in a plurality of operating states as a response to the modulation of the power provided on the power line. In this way, one input at the autonomous emergency light unit is sufficient for the autonomous emergency light unit to receive power and control information. Accordingly, only one connection between the emergency light control unit and the autonomous emergency light units is needed for the autonomous emergency light units to be provided with power and control information. This again helps in reducing the wiring of the emergency lighting system.

The term "modulation" refers to any kind of variation of the power over time. The emergency light control commands may be contained in a predefined momentary state or in a predefined course over time. For example, a particular voltage level of the power may be a particular command from the emergency light control unit to the autonomous emergency light units. In other words, different voltage levels of the power may indicate different desired behaviors of the autonomous emergency light units. It is also possible that a particular voltage sequence, such as a predefined voltage pulse, may be a particular command from the emergency light control unit to the autonomous emergency light units. In any case, a time variation of the power on the power line is a suitable way of providing the emergency light control commands to the autonomous emergency light units.

According to a further embodiment, the emergency lighting system further comprises a control signal channel between the emergency light control unit and the plurality of autonomous emergency light units, with the emergency light control unit being configured to communicate the emergency light control commands to the plurality of autonomous emergency light units via the control signal channel, with the control signal channel comprising one of a wired control signal connection and a wireless control signal channel. The wired control signal connection may be an electric or an optical control signal channel. By providing a dedicated control signal channel, the power line may be freed from command information, allowing for a steady power supply thereon. Also, the separate control signal channel may be optimized for the transmission of information, which may lead to a more efficient communication than over the power line, where power transmission requirements have to be taken into account.

According to a further embodiment, each of the autonomous emergency light units is configured, upon detection of no power being provided on the power line, to discharge their respective rechargeable capacitor over their respective at least one LED for illuminating their respective at least one LED. The rechargeable capacitor is discharged over the at least one LED, thereby illuminating the emergency light unit, when no power is available on the power line. In other words, the autonomous emergency light unit interprets the absence of power supply as an indication that damage to the emergency lighting system occurred, which in turn is an indication that an emergency situation is present. In yet other words, the state of no power being provided over the power line is used as a piece of information indicating that the external power supply may be interrupted or that the wiring within the emergency lighting system is damaged. The energy stored in the rechargeable capacitor is used to illuminate the emergency light unit in an autonomous manner.

The expression "no power being provided on the power line" does not necessarily relate to the absence of power flow on the power line. It rather relates to the situation where the autonomous emergency light unit cannot draw power from the power line. In other words, if the emergency light unit has the option to draw power from the power line, then there is power provided on the power line and the state of "no power being provided on the power line" is not present. In yet other words, the expression refers to the question whether or not a functioning power supply to the autonomous emergency light unit is present. For example, a certain voltage on the power line may indicate the potential to draw power, independent from the actual power flow at that point in time.

According to a further embodiment, each of the plurality of autonomous emergency light units comprises an external power input for receiving power from outside of the emergency lighting system for charging their respective rechargeable capacitor and illuminating their respective at least one LED. Again, the term "external power input" refers to a power input for receiving power from outside of the emergency lighting system, as discussed above. In this way, the power wiring within the emergency lighting system is kept low, as the autonomous emergency light units are directly coupled to external power sources.

According to a further embodiment, the external power input of each of the plurality of autonomous emergency light units is one of a wired external power input and a wireless energy harvesting circuit. Wired connections to the aircraft power network may provide for a simple power supply, as the aircraft power network runs through the entire aircraft. It is also possible to equip the autonomous emergency light units with wireless energy harvesting circuits that absorb energy emitted in a wireless manner by suitable energy transmitters. This technology may be suitable for poorly accessible emergency light units and/or in general in order to save wiring. It is also possible to provide a combination of emergency light units with wired external power inputs and emergency light units with wireless energy harvesting devices in the emergency lighting system.

According to a further embodiment, the emergency lighting system further comprises a control signal channel between the emergency light control unit and the plurality of autonomous emergency light units, with the emergency light control unit being configured to communicate the emergency light control commands to the plurality of autonomous emergency light units via the control signal channel, with the control signal channel comprising one of a wired control signal connection and a wireless control signal channel. In the absence of a power line between the emergency light control unit and the plurality of autonomous emergency light units, the dedicated control signal channel allows for the communication of the emergency light control commands. Above remarks with respect to the additional control signal channel apply analogously.

According to a further embodiment, each of the autonomous emergency light units is configured, upon detection of no power being provided on their respective external power input, to discharge their respective rechargeable capacitor over their respective at least one LED for illuminating their respective at least one LED. This corresponds to the situation of no power being provided on the power line of the emergency lighting system for the case of such a power line being present, as discussed above. Again, the autonomous emergency light unit interprets the absence of power supply as an indicator for an emergency. Above remarks with respect to the discharge of the rechargeable capacitor over the at least one LED apply analogously.

According to a further embodiment, the at least one external control input comprises a first external control input for receiving a first external control command from one of a cockpit crew, a board computer and an autopilot and a second external control input for receiving a second external control command from a cabin crew, wherein the emergency light control unit is configured to generate a particular emergency light control command as a response to the first and second external control commands. In this way, the emergency lighting system is adapted to receive and process external control commands from both the flight crew sphere, including commands from the flight crew directly, from the board computer and from the autopilot, as well as from the cabin crew sphere. The emergency light control unit is configured to weigh the different external control commands and to prioritize them in case of inconsistent instructions. It is also possible that there are a third and potentially a fourth external control input provided for being coupled to the autopilot and the board computer.

According to a further embodiment, the emergency light control commands comprise a charge and illumination command, as a response to which the plurality of autonomous emergency light units are configured to charge their respective rechargeable capacitor and to illuminate their respective at least one LED. In other words, each of the plurality of autonomous emergency light units is configured to charge its rechargeable capacitor and to illuminate its at least one LED as a response to the charge and illumination command. In this way, the emergency light control unit can instruct the autonomous emergency light units in such a way that the rechargeable capacitors are charged for being ready for an emergency situation and that the emergency lights light up. These two actions can be concurrently carried out during boarding, such that the passengers can make themselves familiar with the emergency lights on the plane.

According to a further embodiment, the emergency light control commands comprise an armed and charge command, as a response to which the plurality of autonomous emergency light units are configured to charge their respective rechargeable capacitor and to set themselves in an alert condition. The armed and charge command may be the default command during flight. The charge on the capacitors is maintained in order to be prepared for an emergency situation. Moreover, the autonomous emergency light units are in an alert state, ready to illuminate the respective at least one LED. This alert state may consist in a state where the mere closing of one switch in the emergency light unit leads to the illumination of the emergency light unit. The alert state, i.e. the armed portion of the armed and charge state, may also be more involving. For example, the autonomous emergency light unit may comprise a crash sensor. This crash sensor may be placed in a monitoring state by the armed and charge command. Once the crash sensor, which may be an acceleration sensor, senses values indicative of a crash, it may trigger the illumination of the at least one LED without a command from the emergency light control unit.

According to a further embodiment, the emergency light control commands comprise a shut down command, as a response to which the plurality of autonomous emergency light units are configured to discharge their respective rechargeable capacitor via a respective power dissipation circuit. In other words, each autonomous emergency light unit may comprise a power dissipation circuit having a power dissipation element, such as a resistor, through which the capacitor can be discharged. In this way, the autonomous emergency light unit can be brought into a safe, fully discharged state, when no emergency is to be expected, such as during the parking of the aircraft over night.

According to a further embodiment, the at least one LED of the respective autonomous emergency light unit is a plurality of LEDs. In other words, each of the autonomous emergency light units may have one LED or a plurality of LED's. By providing a plurality of LED's, the light capacity and the color of the autonomous emergency light unit may be put in a desired range. Also, manufacturing tolerances may be evened out by providing a plurality of LED's. The plurality of LED's may be coupled in series or in parallel or in a combination of series and parallel connections.

Exemplary embodiments of the invention further include an emergency lighting system for an aircraft, which comprises an emergency light control unit, having an external power input, at least one rechargeable capacitor, and at least one external control input for receiving external control commands from at least one of a cockpit crew, a cabin crew, a board computer and an autopilot, and a plurality of emergency light units, each of the plurality of emergency light units comprising at least one LED and being coupled to the emergency light control unit via a power line. The emergency light control unit is configured to process the external control commands and, as a response to the external control commands, to charge the at least one rechargeable capacitor and to provide the plurality of emergency light units with power for illuminating their respective at least one LED. This emergency lighting system is an alternative to above discussed emergency lighting system. It has a different structure, but also makes use of the capacitor as a rechargeable power source. In this way, this embodiment of the emergency lighting system also has a reduced maintenance as compared to the prior art systems discussed above.

This embodiment has the additional advantage that it can be used with existing power wiring in existing airplanes. By replacing prior art power supply modules with the emergency light control units of this embodiment, the maintenance requirements can be reduced without having to alter the network topology or emergency lights of the existing emergency lighting systems. Above described features and modifications may also be applied to this embodiment and are not repeated for brevity.

Exemplary embodiments of the invention further include an emergency lighting system for an aircraft, which comprises a plurality of autonomous emergency light units, each of the plurality of autonomous emergency light units comprising: at least one LED, a rechargeable capacitor, an external power input, at least one external control input for receiving external control commands from at least one of a cockpit crew, a cabin crew, a board computer and an autopilot, and a light unit control logic. The emergency light control unit of each of the plurality of autonomous emergency light units is configured to process the external control commands and, as a response to the external control commands, to charge the respective rechargeable capacitor and to illuminate the respective at least one LED. This emergency lighting system is another alternative to above discussed emergency lighting systems. It has a different structure, but also makes use of the capacitor as a rechargeable power source. The emergency light units of this embodiment are highly autonomous, as they are able to function entirely independently from any power wiring within the emergency lighting system. Instead, each of the autonomous emergency light units receives all the "raw" inputs, namely the external control commands from at least one of a cockpit crew, a cabin crew, a board computer and an autopilot as well as external power from a readily available power network, such as the general aircraft power network. This set-up requires all emergency light units to be connected to the power network and to receive the external control commands, but eliminates the need for power wiring within the emergency lighting system. Above described features and modifications may also be applied to this embodiment and are not repeated for brevity.

It is pointed out that the expression "to charge the respective rechargeable capacitor and to illuminate the respective at least one LED" does not require both of these actions to take place all the time and/or at the same time. If any and which of these actions are performed by the emergency light unit, depends on the emergency light control commands. In other words, depending on the emergency light control commands, the autonomous emergency light unit may at a given time charge the capacitor or illuminate the at least one LED or both or none of these actions.

Exemplary embodiments of the invention further include an aircraft, such as a plane or a helicopter or a spacecraft, comprising at least one emergency lighting system, as described in any of the embodiments above. Above modifications and advantages equally relate to the aircraft. An aircraft may have a plurality of above described emergency lighting systems, each of them being responsible for a certain part of the aircraft and/or for certain kinds of emergency lights, such that above described emergency lighting systems are subsystems of the overall emergency lighting system. For example, an aircraft may have between 4 and 8, in particular 6, emergency lighting systems, with those emergency lighting systems jointly having between 30 and 50, in particular between 35 and 45, light units. However, it is also possible that the aircraft has exactly one emergency lighting system.

BRIEF DESCRIPTION OF DRAWINGS

Embodiments of the invention are described in greater detail below with reference to the Figures.

FIGS. 3a, 3b and 3c show block diagrams of three further exemplary emergency lighting systems in accordance with the invention.

FIG. 4 shows a block diagram of another exemplary emergency lighting system in accordance with the invention.

FIG. 5 shows a block diagram of another exemplary emergency lighting system in accordance with the invention.

DETAILED DESCRIPTION

Figure 1:
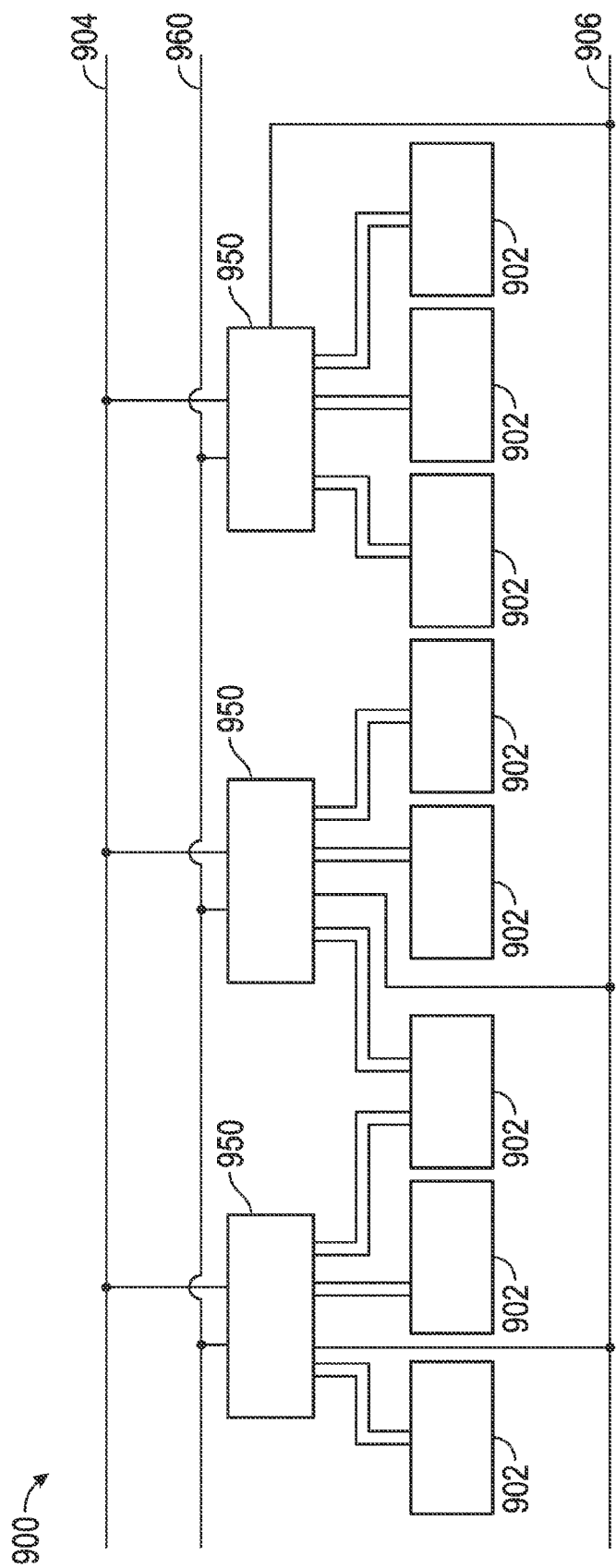
FIG. 1 shows a block diagram of a prior art emergency lighting system.
Figure 2A:
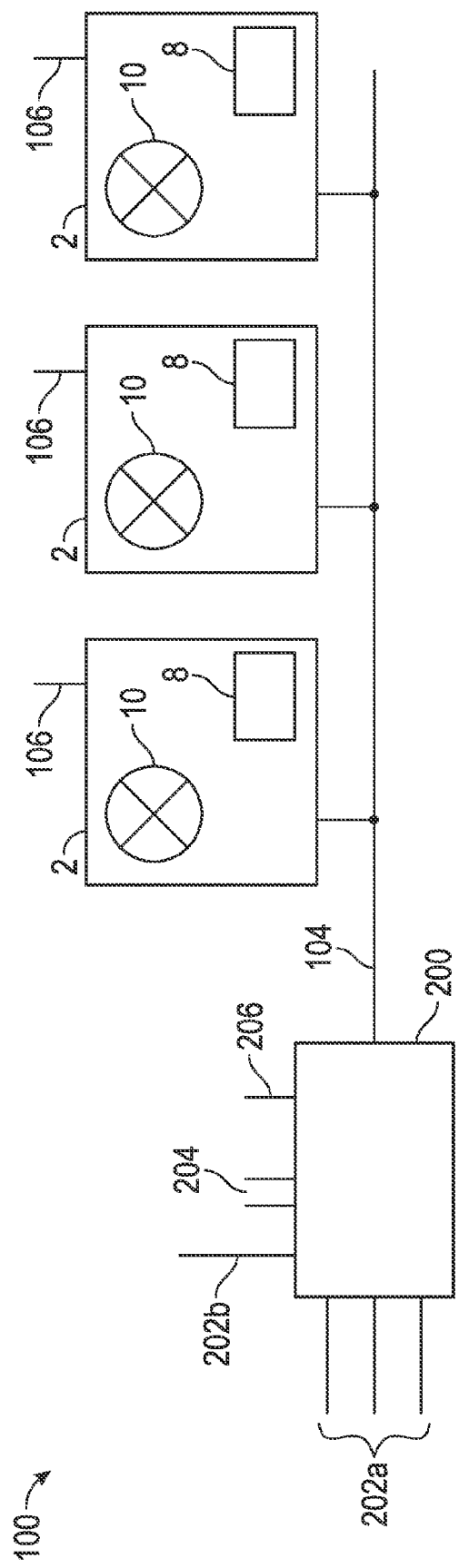
FIGS. 2a and 2b show block diagrams of two exemplary emergency lighting systems in accordance with the invention.

FIG. 2a shows a block diagram of an exemplary emergency lighting system 100 in accordance with the invention. The emergency lighting system 100 comprises an emergency light control unit 200 and three autonomous emergency light units 2, which are coupled to the emergency light control unit 200 via a power line 104. The autonomous emergency light units 2 are further each coupled to ground 106.

Each of the autonomous emergency light control units 2 comprises a capacitor 8 and a plurality of LED's 10, only one of which being shown for each of the autonomous emergency light units 2 in FIG. 2. Each of the autonomous emergency light units 2 further comprises a light unit control logic (not shown), which is coupled to the power line 104 and controls the coupling between the power line 104, the capacitor 8 and the plurality of LED's 10, as will be described below.

The emergency light control unit 200 has an external power input 204, where it is coupled to an external power source, such as a standard 28 V aircraft power network. The emergency light control unit 200 is further coupled to ground 206.

Moreover, the emergency light control unit 200 has two external control inputs 202a and 202b. The first external control input 202a is coupled to the cockpit. The flight crew can communicate three commands to the emergency light control unit 200 via the first external control input 202a, namely to turn the emergency lights on, to put the emergency lights in an armed state, i.e. in an alert state, and to turn the emergency lights off. These three commands are illustrated by the three lines of the first external control input 202a in FIG. 2a. The second external control input 202b is coupled to one or more switches in the cabin for the cabin crew to operate. The cabin crew can only issue a lights on command via the second external control input 202b. If no such lights on command is issued by the cabin crew, the emergency light control unit 200 relies on the cockpit crew commands, received via the first external control input 202a. The limited command selection for the cabin crew is illustrated by the single line of the second external control input 202b in FIG. 2a.

The operation of the emergency light control unit 200 and of the entire emergency lighting system 100 will be described as follows. Upon receiving a lights on command from the cabin crew via the second external control input 202b or from the cockpit crew via the first external control input 202a, which lights on command is commonly given during boarding, the emergency light control unit 200 acts as follows. The emergency light control unit 200 supplies power with a voltage of 12V to the autonomous emergency light units 2 via the power line 104, with power with a voltage of 12V being a charge and illumination command. Each of the autonomous emergency light units 2 reacts as follows. The light unit control logic interprets the reception of power with a voltage of 12V as a charge and illumination command. It uses the power from the power line 104 for charging the capacitor 8 (or for maintaining the charge on the capacitor 8) as well as for sending a current through the LED's 10 for illuminating the emergency light unit 2. In this way, the passengers can make themselves familiar with the emergency system of the aircraft during boarding and the capacitors 8 are charged before take-off.

Upon receiving an armed command from the cockpit crew via the first external control input 202*a*, which armed command is commonly given before take-off and which is the default command during the flight, the emergency light control unit 200 acts as follows. The emergency light control unit 200 supplies power with a voltage of 28V to the autonomous emergency light units 2 via the power line 104, with power with a voltage of 28V being an armed and charge command. Each of the autonomous emergency light units 2 reacts as follows. The light unit control logic interprets the reception of power with a voltage of 28V as an armed and charge command. It uses the power from the power line 104 for charging the capacitor 8 (or for maintaining the charge on the capacitor 8). Moreover, it puts the autonomous emergency light unit in an armed state, i.e. in a state of alert. This state of alert may have numerous forms. It is possible that the autonomous emergency light unit assumes a ready state where the closing of one switch is all it takes for the LED's 10 to light up. It is also possible that the state of alert triggers the operation of one or more sensors in the autonomous emergency light unit 2. The one or more sensors are configured to detect potentially dangerous situations and are configured to effect current flow through the LED's 10 upon detection of such potentially dangerous situations. During a normal flight, the emergency light control unit 200 maintains the provision of power with a voltage of 28V on the power line 104, thereby keeping the capacitors 8 charged and keeping the autonomous emergency light units 2 in an alert state.

Upon receiving a lights off command from the cockpit crew via the first external control input 202*a*, which lights off command is commonly given after landing and parking of the aircraft, the emergency light control unit 200 acts as follows. The emergency light control unit 200 supplies a pulse of negative voltage, e.g. −12V, to the autonomous emergency light units 2 via the power line 104, with such a negative voltage pulse being a shut down command. Each of the autonomous emergency light units 2 reacts as follows. The light unit control logic interprets the reception of the negative voltage pulse as a shut down command. It couples the capacitor 8 to a power dissipation circuit where the charge from the capacitor 8 is dissipated, such as transformed into heat via a resistor. The autonomous emergency light unit 2 is brought into a safe, fully discharged state in this way. In order to be able to issue the negative voltage pulse even in a situation where the aircraft power network has already been switched off, the emergency light control unit 200 may comprise a capacitor capable of storing enough energy for such a pulse.

As described above with respect to the various operational states, the power line 104 acts as a power and information bus between the emergency light control unit 200 and the autonomous emergency light units 2.

In the case of an emergency, there are three ways how the LED's 10 of the autonomous emergency light units 2 are brought to light up, i.e. how the autonomous emergency light units 2 are brought to being illuminated. First, the cockpit crew or the cabin crew may give a lights on command, which leads to the behavior of the emergency lighting system 100 discussed above.

Second, while the emergency lighting system 100 is in an armed state, which means that the autonomous emergency light units 2 are in an armed and charge state, the sensors in the autonomous emergency light units 2 may sense a potentially dangerous situation and effect a lighting up of the LED's 10. For example, an acceleration sensor in an autonomous emergency light unit 2 may detect an acceleration of more than 30 g, which is a very good indication for a crash. At that point, the emergency light control logic together with the sensor will effect an illumination of the LED's 10.

Third, a loss of power on the power line 104 is interpreted by the autonomous emergency light units 2 as a failure of the emergency lighting system 100. This may be due to the aircraft power network breaking down or due to the wiring within the emergency lighting system 100 being interrupted. Such events are indicators for an emergency, potentially even a fatal emergency involving a crash and a fuselage breaking, leading to the interruption of wiring. The autonomous emergency light units interpret the loss of power on the power line 104 as a state of emergency, in which they discharge the respective capacitors 8 over the LED's 10 over time. This discharge is effected in a way to have the LED's illuminated for more than 10 minutes, preferably more than 15 minutes, and even more preferably for more than 20 minutes. In this way, the emergency light units are illuminated during at least the duration of a typical emergency disembarking operation.

Figure 2B:
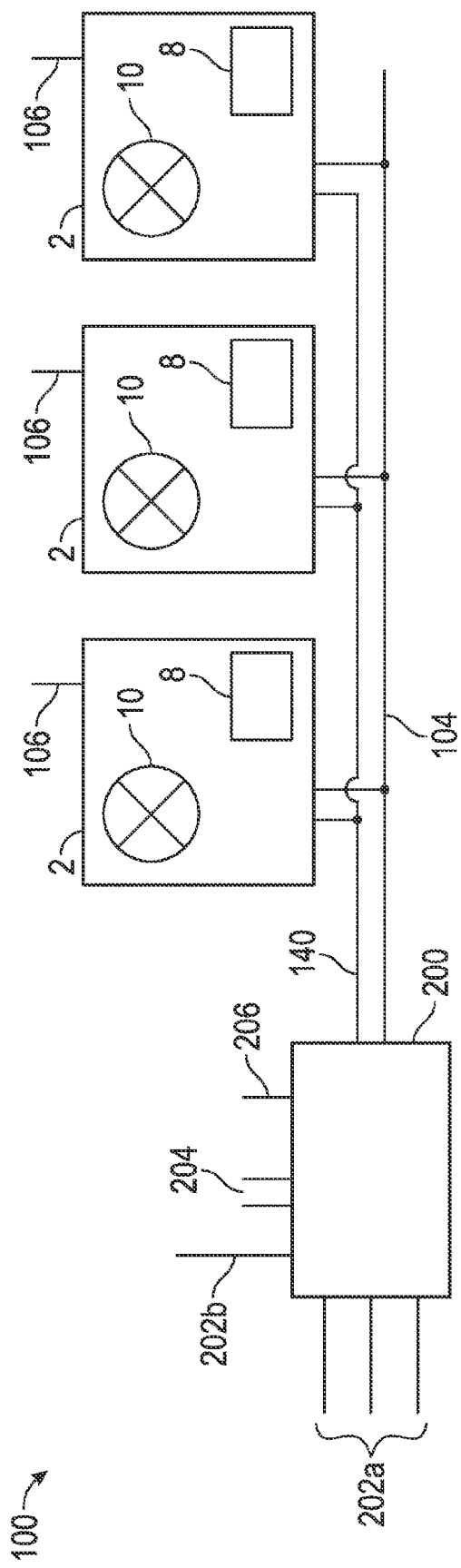

FIG. 2*b* shows another exemplary emergency lighting system 100 in accordance with the invention. The exemplary emergency lighting system 100 of FIG. 2*b* is very similar to the emergency lighting system 100 of FIG. 2*a*. Like elements are denoted with like reference numerals, and a description thereof is omitted for brevity. The only differences between the embodiments of FIG. 2*a* and FIG. 2*b* are the different ways of providing power via the power line 104 and of providing emergency light control commands from the emergency light control unit 200 to the autonomous emergency light units 2. As described above with respect to FIG. 2*a*, the emergency light control unit 200 of FIG. 2*a* supplies modulated power on the power line 104, with the modulation containing the emergency light control commands.

In contrast thereto, the emergency light control unit 200 of FIG. 2*b* supplies power of a constant voltage of 28V to the autonomous emergency light units 2. For communicating the emergency light control commands, a separate control signal channel 140 is coupled between the emergency light control unit 200 and the autonomous emergency light units 2. In the embodiment of FIG. 2*b*, the separate control signal channel 140 is an electric wire. The emergency light control unit 200 may use any suitable manner, such as an appropriate communications protocol, for applying the emergency light control commands to the control signal channel 140 and thereby transmitting the control information to the autonomous emergency light units 2.

FIG. 3*a* shows another exemplary emergency lighting system 100 in accordance with the invention. The exemplary emergency lighting system 100 of FIG. 3*a* is very similar to the emergency lighting system 100 of FIG. 2*b*. Like elements are denoted with like reference numerals, and a description thereof is omitted for brevity. The only difference between the embodiments of FIG. 2b and FIG. 3a is a difference in the provision of power to the autonomous emergency light units 2. The power line 104 of FIG. 2b is dispensed with in the embodiment of FIG. 3a. Instead, each of the autonomous emergency light units 2 is individually coupled to an external power source, such as the aircraft power network, via an individual external power input 304. In this case, the autonomous emergency light units 2 may enter an emergency state and discharge the capacitor 8 over the LED's 10 upon the loss of power at the external power input 304. The communication of emergency light control commands via the control signal channel 140 is equal to the embodiment of FIG. 2b.

FIG. 3b shows another exemplary emergency lighting system 100 in accordance with the invention. The exemplary emergency lighting system 100 of FIG. 3b is very similar to the emergency lighting system 100 of FIG. 3a. Like elements are denoted with like reference numerals, and a description thereof is omitted for brevity. The only difference between these embodiments is that the wired control signal channel 140 of FIG. 3a is substituted by a wireless control signal channel 140, illustrated by a dashed line. A wireless sender 280 in the emergency light control unit 200 and wireless receivers 180 in the autonomous emergency light units 2 allow for the wireless transmission of control information.

FIG. 3c shows another exemplary emergency lighting system 100 in accordance with the invention. The exemplary emergency lighting system 100 of FIG. 3c is very similar to the emergency lighting system 100 of FIG. 3b. Like elements are denoted with like reference numerals, and a description thereof is omitted for brevity. The only difference between these embodiments is that the autonomous emergency light units 2 have no wired external power input, coupled to the aircraft power network. Instead, each of the autonomous emergency light units 2 has a wireless energy harvesting circuit 404, with the help of which the respective autonomous emergency light unit receives energy emitted from a wireless energy transmitter, positioned at a suitable location in the aircraft.

FIG. 4 shows a block diagram of another exemplary emergency lighting system 500 in accordance with the invention. The emergency lighting system 500 has an emergency light control unit 520 and a plurality of emergency light units 522, which are coupled to ground 526. Each of the emergency light units 522 comprises a plurality of LED's 10, only one of which being shown for each emergency light unit 522 in FIG. 4.

The emergency light control unit 510 has an external power input 504, a ground terminal 506, a first external control input 502a and a second external control input 502b. These elements correspond to the corresponding elements of the emergency light control unit 200 of FIG. 2a, and a description thereof is not repeated for brevity.

The emergency light control unit 520 comprises a first capacitor 508, arranged within the emergency light control unit 520, and a second capacitor 510, intimately connected to the circuit structure of the emergency light control unit 520, but arranged outside of the emergency light control unit 520.

The emergency light control unit 520 comprises control logic, which interprets the cabin crew and flight crew external control commands. The control logic decides when and to what extent to charge the first and second capacitors 508, 510 as a response to the external control commands. Moreover, whenever the external control commands call for a turning on of the LED's 10 of the emergency light units 522 or whenever a loss of control commands or power commands calls for a turning on of the LED's 10 of the emergency light units 522, the emergency light control unit 520 supplies power with a voltage of 6V on the power line 524, which power with the voltage of 6V is suitable for illuminating the LED's 10.

FIG. 5 shows a block diagram of another exemplary emergency lighting system 600 in accordance with the invention. The emergency lighting system 600 has a plurality of autonomous emergency light units 620. Each of the autonomous emergency light units 620 has an external power input 604, a ground terminal 606, a first external control input 602a and a second external control input 602b. These elements correspond to the corresponding elements of the emergency light control unit 200 of FIG. 2a, and a description thereof is not repeated for brevity.

Each of the autonomous emergency light units 620 further comprises a capacitor 608, a plurality of LED's 10, only one of which being shown in FIG. 5, and a control logic 610. The control logic 610 decides when and to what extent to charge the capacitor 608, when to put the autonomous emergency light unit in an armed state and when to effect a current flow through the LED's 10 as a response to the external control commands. Moreover, upon a loss of control commands or power commands, the control logic 610 effects for a controlled discharge of the charge of the capacitor 608 over the LED's 10, ensuring illumination of the autonomous emergency light unit in an emergency situation.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:
1. Emergency lighting system for an aircraft, comprising:
an emergency light control unit, having an external power input and at least one external control input for receiving external control commands from at least one of a cockpit crew, a cabin crew, a board computer and an autopilot, and
a plurality of autonomous emergency light units, each of the plurality of autonomous emergency light units comprising at least one LED and a rechargeable capacitor,
wherein the emergency light control unit is configured to process the external control commands and to communicate emergency light control commands to the plurality of autonomous emergency light units as a response to the external control commands:
wherein the emergency lighting system further comprises a power line between the emergency light control unit and the plurality of autonomous emergency light units, with the emergency light control unit being configured to provide the plurality of autonomous emergency light units with power via the power line for charging their respective rechargeable capacitor and illuminating their respective at least one LED; and wherein the emergency light control unit forms the sole coupling point to a power supply outside of the emergency lighting system.

2. Emergency lighting system according to claim 1, wherein the emergency light control unit is configured to communicate the emergency light control commands to the plurality of autonomous emergency light units as a modulation of the power provided on the power line.

3. Emergency lighting system according to claim 1, further comprising a control signal channel between the emergency light control unit and the plurality of autonomous emergency light units, with the emergency light control unit being configured to communicate the emergency light control commands to the plurality of autonomous emergency light units via the control signal channel, with the control signal channel comprising one of a wired control signal connection and a wireless control signal channel.

4. Emergency lighting system according to claim 1, wherein each of the autonomous emergency light units is configured, upon detection of no power being provided on the power line, to discharge their respective rechargeable capacitor over their respective at least one LED for illuminating their respective at least one LED.

5. Emergency lighting system according to claim 1, wherein the at least one external control input comprises a first external control input for receiving a first external control command from one of a cockpit crew, a board computer and an autopilot and a second external control input for receiving a second external control command from a cabin crew, wherein the emergency light control unit is configured to generate a particular emergency light control command as a response to the first and second external control commands.

6. Emergency lighting system according to claim 1, wherein the emergency light control commands comprise a charge and illumination command, as a response to which the plurality of autonomous emergency light units are configured to charge their respective rechargeable capacitor and to illuminate their respective at least one LED.

7. Emergency lighting system according to claim 1, wherein the emergency light control commands comprise an armed and charge command, as a response to which the plurality of autonomous emergency light units are configured to charge their respective rechargeable capacitor and to set themselves in an alert condition.

* * * * *